(12) United States Patent
Alahrache et al.

(10) Patent No.: US 9,260,341 B2
(45) Date of Patent: Feb. 16, 2016

(54) TRANSPARENT ALUMINATE GLASSES, VITROCERAMICS, AND CERAMICS

(71) Applicant: CENTRE NATIONAL DE LA RECHERCHE SCIENTIFIQUE(CNRS), Paris (FR)

(72) Inventors: Salaheddine Alahrache, Orleans (FR); Mathieu Allix, Olivet (FR); Guy Matzen, Saint Denis En Val (FR); Francis Millot, Charenton Le Pont (FR); Marina Licheron, Olivet (FR); Thierry Cardinal, Salles (FR); Alain Garcia, Talence (FR); Kholoud Al Saghir, Orleans (FR)

(73) Assignee: CENTRE NATIONAL DE LA RECHERCHE SCIENTFIIQUE (CNRS), Paris (FR)

( * ) Notice: Subject to any disclaimer, the term of this patent is extended or adjusted under 35 U.S.C. 154(b) by 0 days.

(21) Appl. No.: 14/362,083

(22) PCT Filed: Nov. 30, 2012

(86) PCT No.: PCT/EP2012/074171
§ 371 (c)(1),
(2) Date: May 30, 2014

(87) PCT Pub. No.: WO2013/079707
PCT Pub. Date: Jun. 6, 2013

(65) Prior Publication Data
US 2014/0336032 A1 Nov. 13, 2014

(30) Foreign Application Priority Data
Dec. 1, 2011 (FR) ..................................... 11 61025
Sep. 21, 2012 (FR) ..................................... 12 58910

(51) Int. Cl.
C03C 10/02 (2006.01)
C03C 10/00 (2006.01)
C03C 3/12 (2006.01)
C04B 35/115 (2006.01)
C04B 35/44 (2006.01)
C04B 35/653 (2006.01)
C03C 3/062 (2006.01)

(52) U.S. Cl.
CPC ................. *C03C 10/00* (2013.01); *C03C 3/062* (2013.01); *C03C 3/12* (2013.01); *C03C 3/125* (2013.01); *C04B 35/115* (2013.01); *C04B 35/44* (2013.01); *C04B 35/653* (2013.01); *C03C 2203/00* (2013.01); *C03C 2204/00* (2013.01); *C04B 2235/3206* (2013.01); *C04B 2235/3208* (2013.01); *C04B 2235/3213* (2013.01); *C04B 2235/3215* (2013.01); *C04B 2235/3286* (2013.01); *C04B 2235/3409* (2013.01); *C04B 2235/3418* (2013.01); *C04B 2235/6567* (2013.01); *C04B 2235/9653* (2013.01)

(58) Field of Classification Search
CPC ................................ C03C 10/00; C03C 3/125
See application file for complete search history.

(56) References Cited

U.S. PATENT DOCUMENTS

| | | | |
|---|---|---|---|
| 3,635,739 A | 1/1972 | MacDowell et al. | |
| 3,926,603 A * | 12/1975 | Plesslinger et al. | 65/33.9 |
| 4,861,734 A * | 8/1989 | MacDowell | 501/10 |
| 5,998,315 A | 12/1999 | Jubb | |
| 7,285,507 B2 * | 10/2007 | Fukuta et al. | 501/8 |
| 8,679,996 B2 * | 3/2014 | Menke et al. | 501/120 |
| 2011/0143911 A1 | 6/2011 | Menke et al. | |
| 2011/0251045 A1 | 10/2011 | Saito et al. | |
| 2012/0035046 A1 * | 2/2012 | Rosenflanz | 501/135 |
| 2014/0128241 A1 * | 5/2014 | Rosenflanz et al. | 501/32 |

FOREIGN PATENT DOCUMENTS

| | | |
|---|---|---|
| EP | 0286180 A1 | 10/1988 |
| EP | 1690913 A1 | 8/2006 |
| FR | 2350311 A1 | 12/1977 |
| FR | 2909096 A1 | 5/2008 |

OTHER PUBLICATIONS

Saghir et al., "Transparency through Structural Disorder: A New Concept for Innovative Transparent Ceramics", Chemistry of Materials, 2015, 27(2), pp. 508-514.
Alahraché et al., "Perfectly Transparent Sr3Al2O6 Polycrystalline Ceramic Elaborated from Glass Crystallization", Chemistry of Materials, vol. 25, Sep. 27, 2013, pp. 4017-4024.
Allix et al., "Highly Transparent BaAl4O7 Polycrystalline Ceramic Obtained by Full Crystallization from Glass", XP55037229, Materials Views, Advanced Materials, 2012, pp. 1-6.
International Search Report (Form PCT/ISA/210) for International Application No. PCT/EP2012/074171, dated Jan. 7, 2013.
Licheron et al., "Influence of alkaline earth on the structure of aluminate glasses", Paragraph 0339, Poster Presentations, XXII International Congress on Glass, Sep. 20-25, 2010, pp. 140-141.

(Continued)

*Primary Examiner* — Karl Group
(74) *Attorney, Agent, or Firm* — Birch, Stewart, Kolasch & Birch, LLP (57) ABSTRACT

The invention relates to novel transparent glasses, vitroceramics, and transparent or translucent ceramics containing, in relation to the total composition of the glass, vitroceramic, or ceramic, at least 60 wt % of a composition having the following formula (I): $(M1O)x(M2O)y(M3_2O_3)z(Al_2O_3)100-x-y-z$ (I), where M1 is an element selected from among Ba and/or Sr, M2 is an element selected from among Mg or Ca, x and y are numbers such that $30 \leq x+y \leq 80$, y is between 0% and 10% of x, M3 is an element selected from among B, Ga, or In, and z is a number between 0% and 10% of (100-x-y). The invention also relates to the method for manufacturing said compositions and to the uses of said compositions in the field of optics.

43 Claims, 3 Drawing Sheets

(56) References Cited

OTHER PUBLICATIONS

Licheron et al., "Raman and 27Al NMR structure investigations of aluminate glasses: (1-x) Al2O3—x MO, with M=Ca, Sr, Ba and 0.5<x<0.75)", Journal of Non-Crystalline Solids, vol. 357, 2011 (Available online Apr. 7, 2011), pp. 2796-2801.

Montouillout et al., "Unexpected aluminum and oxygen coordination in glassy and crystalline BaAl4O7 samples, evidenced by powder diffraction and high-resolution NMR experiments", Congress RMN, Summer 2010, 1 page.

Poort et al., "Luminescence of Eu2+ in Barium and Strontium Aluminate and Gallate", XP000609200, Chemistry of Materials, vol. 7, No. 8, 1995, pp. 1547-1551.

Skinner et al., "Novel behaviour and structure of new glasses of the type Ba—Al—O and Ba—Al—Ti—O produced by aerodynamic levitation and laser heating", Journal of Physics: Condensed Matter, vol. 18, No. 32, Aug. 16, 2006 (Published Jul. 24, 2006), pp. 407-414.

\* cited by examiner

TRANSPARENT ALUMINATE GLASSES, VITROCERAMICS, AND CERAMICS

FIELD OF THE INVENTION

The present invention relates to novel compositions of transparent glasses, transparent or translucid glassceramics as well as ceramics, manufacturing process and uses thereof.

BACKGROUND OF THE INVENTION

Due to their crystalline character, ceramics and glassceramics exhibit optical properties which make them particularly interesting relative to the corresponding glasses. In addition, applications in optics require the use of transparent or at least translucid ceramics, a prerequisite feature for good optical properties. The relevant wavelengths are those of the visible light spectrum, that is, between 400 nm and 800 nm.

However, if it is easy to produce transparent glasses, producing transparent or at least completely translucid (ceramics) or partially (glassceramics) crystallised materials is much more difficult.

Compositions of transparent or translucid crystallised materials have been described in the prior art, however they correspond essentially either to monocrystals or to nanocrystallised ceramics.

Manufacturing processes of monocrystals, often based on the Czochralski method, require manufacturing times ranging from several days to several weeks and operating temperatures greater than 1500° C. for usually used oxides. The resulting crystals have a size of the order of a few centimetres.

Manufacturing processes for nanocrystallised ceramics generally make use of nanometric particles, costly to make from precursors. The particles undergo a pressing step, then a sintering step at a temperature often greater than 1500° C. During this sintering step growth of the crystals occurs. Mastering this step is particularly critical, since it is in general necessary to conserve crystals of nanometric size, usually less than 100 nm (less than the lower limit of the visible wavelength), to retain transparency. If the crystalline growth is too important, opaque ceramics are obtained.

These monocrystals and nanocrystallised ceramics, highly adapted for high performance applications such as LASER applications, have a manufacturing cost far too high for commoner applications, for example for display, lighting or medical imaging.

There is therefore a need for novel ceramics and transparent or translucid glassceramics which combine good optical characteristics, such as luminescence for example, with a relatively inexpensive manufacturing process such as a glassmaking process followed by annealing of the glass.

U.S. Pat. No. 3,635,739 describes transparent or translucid glassceramics composed of 4 to 15% by weight of BaO, 35 to 45% by weight of CaO and 35 to 45% by weight of $Al_2O_3$, obtained by annealing a glass having the composition indicated earlier, comprising also from 5 to 15% by weight of oxide acting as nucleation catalyst, such as $ZrO_2$ and/or $V_2O_3$ and/or $Ta_2O_3$. These glassceramics are crystallised at more than 50% by weight, and generally more than 75% by weight.

It should be noted that the composition of these ceramics is such that the stoxhiometry in CaO is at least 2 times greater than the stoechiometry in BaO.

Contrary to U.S. Pat. No. 3,635,739 which presents glassceramics based on calcium aluminates, the applicant surprisingly found novel compositions based on barium and/or strontium aluminate, with a CaO content much less than that of barium/strontium, or even zero, for making transparent or translucid ceramics and glassceramics having crystals of micrometric size. It would seem in fact that ceramics and glassceramics according to the invention have isotropic optical characteristics, and/or that the difference in refraction index between the crystals and the vitreous phase is sufficiently low for the material to have good transparency properties.

The ceramics and glassceramics according to the invention can be easily obtained by means of an inexpensive glassmaking process, involving an annealing step of a glass of corresponding composition based on barium and/or strontium aluminate.

BRIEF DESCRIPTION OF THE INVENTION

An aspect of the present invention therefore relates to transparent glasses based on barium and/or strontium alurninate.

Another aspect of the present invention relates nsparent or translucid glassceramics based on barium and/or strontium aluminate.

Another aspect of the present invention relates to transparent or translucid ceramics based on barium and/or strontium aluminate.

Another aspect of the present invention relates to a glass manufacturing process of transparent or translucid ceramics and glassceramics based on barium and/or strontium aluminate including an annealing step of a glass having the corresponding composition.

Another aspect of the invention relates to the use of transparent or translucid ceramics and glassceramics based on barium and/or strontium aluminate for manufacturing optical luminescent (fluorescent, phosphorescent) or scintillator type materials.

Another aspect of the invention relates to the use of a glass according to the present invention for laser inscription.

BRIEF DESCRIPTION OF THE FIGURES

The patent or application file contains at least one color drawing. Copies of this patent or patent application publication with color drawings will be provided by the USPTO upon request and payment of the necessary fee.

DEFINITIONS

<<Glass>> is understood in the sense of the present invention as an amorphous inorganic solid, such as a fixed liquid. The solid is not obtained in the form of a powder.

<<Ceramic>> is understood in the sense of the present invention as a polycrystalline inorganic material consisting of crystals of micrometric size, with a crystallisation rate of between 98% and 100%, that is, between 98% and 100% by weight of the material is crystalline. This material is not obtained in the form of a powder.

<<Glassceramic>> is understood in the sense of the present invention as an inorganic material comprising a mixture of glass and crystals, with a crystallisation rate of between 5% and 98%, that is, between 5% and 98% by weight of the material is crystalline. The crystals are therefore encased in a matrix of glass. This material is not obtained in the form of a powder.

<<Micrometric size>> is understood in the sense of the present invention as a size of between 1 μm and 100 μm.

<<Transparent>> is understood in the sense of the present invention of a material which can be seen through. This qualitative notion of transparency is specified quantitatively if needed by measuring specular light transmission. The measuring protocol of specular transmission consists of measuring light intensity according to the axis of the incident light beam. A material can be considered as being transparent (for applications in luminescence or scintillation) when its specular light transmission is greater than or equal to 30%.

<<Translucid>> is understood in the sense of the present invention of a material transmitting light but through which it is not possible to see objects. This notion of translucidity is specified if needed by measuring total light transmission. The measuring protocol of the total transmission consists of measuring the light intensity (specular diffused) according to a solid angle of 180°.

In the specification of the present invention, the terms <<material>> or <<materials>> designate the transparent glasses, transparent or translucid ceramics and glassceramics of the present invention, In the specification of the present invention, the numbers x, y and z (relative to the reference composition of formula 1) represent molar proportions. As everywhere, unless specified otherwise, expressed percentages represent mass percentages and are expressed relative to the total mass of the reference element. For example, when it is indicated that a composition or mixture comprises 10% of a given compound, it is understood that the composition or the mixture comprises 10% by mass of this compound relative to the total mass of this composition or this mixture.

A preparation process for ceramics and/or glassceramics including an annealing step of a glass is designated in the present description by the term <<glassmaking process>>. <<Annealing of a glass>> is understood as a thermal processing of this glass allowing to have it crystallise in a controlled manner.

DETAILED DESCRIPTION OF THE INVENTION

Glass, Glassceramic and Ceramic

The materials of the present invention are prepared from the same raw materials. Typically, the transparent or translucid ceramics and glassceramics of the present invention are prepared by annealing of a glass, and they therefore have the same constitution as the glass from which they derive.

The material according to the present invention comprises at least 60%, such as from 60% to 100%, preferably 75% to 100%, by mass, relative to the total mass of the material, of a composition of the following formula I:

$$(M_1O)_x(M_2)_y((M_3)_2O_3)_z(Al_2O_3)_{100-x-y-z} \quad (I)$$

where
$M_1$ represents an element selected from Ba and/or Sr, and
$M_2$ represents an element selected from Mg or Ca, and
x and y represent numbers such that $30 \leq x+y \leq 80$, and
y is between 0 and 10% of x, and $M_3$ represents an element selected from B, Ga or In, and
z represents a number between 0 and 10% of (100−x−y). with the exclusion of materials comprising 100% by mass of a composition of formula.:

$$(MO)_x(Al_2O_3)_{100-x}$$

with M representing an element Ba or Sr and x representing a number between 55 and 75, when the material is a transparent glass.

In fact, these last compositions have been disclosed by Licheron et al (*Journal of Non-Crystalline Solids* 2011, 357, 2796-2801).

When the material is a glass, it also comprises dopants.

The compositions of formula (I) resulting in materials of the present invention can, for some, show analogies (for example a high alumina, barium and/or strontium content) with compositions resulting in materials intended for very different applications. For example, alkaline earth aluminates constitute a base common to numerous materials: glasses for glass fibres, refractory materials, cements, mortars, etc., without as such resulting in materials of the present invention. The materials of the present invention present different characteristics.

First, the materials of the present invention are transparent. This characteristic is necessary for using materials of the present invention in optics. Refractory materials, cements and mortars prepared from the same raw materials as the materials of the present invention are not transparent.

Since the glasses of the present invention are intended for the field of optics they also contain dopants (rare earths or transition elements), giving them specific optical properties (luminescence in particular).

The ceramics and glassceramics of the present invention differ from materials obtained by sintering by their density: the density of ceramics and glassceramics of the present invention is the theoretical density (absence of porosity). Theoretical density is understood as the density calculated from crystallographic data (structure and mesh parameters) in the absence of porosity. The use of a glassmaking process produces a material of theoretical density (absence of porosity). On the contrary, materials obtained by sintering (including pressing) often have residual porosity (and therefore a density lower than the theoretical density) which reduces transparency.

The ceramics and glassceramics of the present invention, that is, obtained by a glassmaking process, have very fine grain joints, of the order of a nanometre (as observed via an electronic transmission microscope). Typically, the majority of grain joints, that is, at least 90% of grain joints, measures less than 10 nm. The crystallisation of glasses of the invention results in these very fine grain joints. The very fine grain joints limit diffusion and therefore allow for retaining good transparency.

The ceramics and glassceramics of the present invention, that is, obtained by a glassmaking process, present a polycrystalline structure in which the crystals have a micrometric size. They thus differ from manometric, polycrystalline ceramics or monocrystals employed in optics.

Finally, the ceramics and glassceramics of the present invention, that is, obtained by a glassmaking process, present a polycrystalline structure in which the crystals present an isotropic character with low birefringence (very close optical indices for the different crystallographic axes) even if they do not have a cubic structure (orthorhombic for $BaAl_4O_7$). This avoids the size constraint of nanometric grain difficult to control at the process level (case of nanotnetric ceramics): the ceramics of the invention present larger grains (micrometric size) less restrictive for the process, and remain transparent all the same.

The preparation of ceramics and glassceramics of the present invention by a glassmaking process associated with the choice of compositions of formula (I) gives these materials remarkable properties: good transparency linked to the process (absence of porosity and joints of very fine grains) and to compositions of ceramics (isotropic grains with low birefringence), good optical properties adjustable as a function of the presence and choice of the dopants, the possibility of producing varied forms and substantial dimensions due to the process (cast in a mould), finally a much lower cost than similar optical materials (monocrystals and nanoceramics transparent) due to an inexpensive process.

Therefore, the present invention relates quite particularly to transparent or translucid ceramics or glassceramics comprising at least 60% by mass, relative to the total mass of the ceramic, of a composition of the following formula I:

$$(M_1O)_x(M_2O)_y((M_3)_2O_3)_z(Al_2O_3)_{100-x-y-z} \quad (I)$$

where
  $M_1$ represents an element selected from Ba and/or Sr, and
  $M_2$ represents an element selected from Mg or Ca, and
  x and y represent numbers such that $30 \leq x+y \leq 80$, and
  y is between 0 and 10% of x, and
  $M_3$ represents an element selected from B, Ga or In
  z represents a number between 0 and 10% of (100−x−y), obtainable by a glassmaking process.

The material of the present invention comprises in addition to the composition of the formula (I) conventional additive elements in glassmaking technique and/or optics. Said conventional additive elements are well known by those skilled in the art.

<<In addition>> such as used in the description of the present invention, means a quantity of additive elements sufficient to reach 100% by mass for the reference material. Therefore the material of the present invention can comprise up to 40%, or up to 25%, by mass of conventional additive elements relative to the total mass of the material.

In an embodiment, the material can comprise in addition to the composition of formula (1) silicon dioxide ($SiO_2$) or boron dioxide ($B_2O_3$). Boron dioxide can be added to the composition of formula (I) even if the latter includes already boron. In fact, the boron dioxide added to the composition of formula (I) plays a different role: it acts as a formative oxide aiding vitrification and not as a substitute for aluminium in the structure of the material. Therefore, in this embodiment, the material can comprise up to 40%, or up to 25%, by mass of $SiO_2$ or $B_2O_3$. Adding $SiO_2$ or $B_2O_3$ significantly lowers the melting temperature of the elements making up the material and makes vitrification easier.

Transparent glasses, transparent or translucid ceramics and glassceramics have been obtained from a mixture comprising 63% of a composition of formula (I) in which $M_1$=Sr, x=50, y=0 and z=0 and 37% of $SiO_2$. These glasses, ceramics and glassceramics present the following formula: $SrAl_2Si_2O_8$. Other examples of transparent glasses, transparent or translucid ceramics and glassceramics include those materials obtained from a mixture comprising 72%, 87.3% of a composition of formula (I) in which $M_1$Sr, x=50, y=0 and z=0 and respectively 28% and 12.7% of $SiO_2$.

Transparent glasses, transparent or translucid ceramics and glassceramics have been obtained from a mixture comprising 68% of a composition of formula (I) in which $M_1$=Ba, x=50, y=0 and z=0 and 32% of $SiO_2$. These glasses, ceramics and glassceramics present the following formula: $BaAl_2Si_2O_8$. Other examples of transparent glasses, transparent or translucid ceramics and glassceramics include materials obtained from a mixture comprising 76.1%, 81%, 85.1% of a composition of formula (I) in which $M_1$=Ba, x=50, y=0 and z=0 and respectively 23.9%, 19%, 14.9% of $SiO_2$.

In another embodiment, the material can comprise in addition to the composition of formula (I) a mixture of additive elements selected from formative oxides of the type $SiO_2$, boron oxide ($B_2O_3$) and phosphorous oxide ($P_2O_5$), modifying alkaline oxides of the type sodium oxide ($Na_2O$) and potassium oxide ($K_2O$), and optionally dopants.

Therefore, in this embodiment, the material can comprise up to 40%, or up to 25%, by mass of a mixture of additive elements selected from formative oxides of type $SiO_2$, boron oxide ($B_2O_3$) and phosphorous oxide ($P_2O_5$), modifying alkaline oxides of the type sodium oxide ($Na_2O$) and potassium oxide ($K_2O$), and optionally dopants. In an embodiment, the mixture of additive elements comprises at least 5% of $SiO_2$, preferably more than 15% of $SiO_2$, up to 15% of $B_2O_3$ (from 0 to 15% of $B_2O_3$), up to 10% of $P_2O_5$ (from 0 to 10% of $P_2O_5$), up to 5% of $Na_2O$ (from 0 to 5% of $Na_2O$) and up to 5% of $K_2O$ (from 0 to 5% of $K_2O$). When adapted, one or more dopants can be added to the mixture. Dopants are typically used to vary the optical properties of glasses, glassceramics and ceramics. For example, it is known that doping by elements belonging to the group of rare earths, for example divalent europium, selects the spectral emission field. The doping element, its concentration and its degree of oxidation are selected as a function of the preferred optical properties for the material. Dopants are generally selected from rare earths, preferably lanthanides. Even more advantageously, dopants are selected from scandium, yttrium, lanthan, cerium, praseodymium, neodymium, samarium, europium, gadolinium, terbium, dysprosium, holmium, erbium, thulium, ytterbium, lutetium and their mixtures. Europium and cerium are preferred but those skilled in the art can be encouraged to perform codoping with several rare earths as a function of the preferred optical properties. Dopants can also be selected from transition elements (for example Cr, Mn, Fe, Co, Ni etc.). When present, dopants can represent up to 5% molar relative to x. Therefore, the material comprises less than 5% by mass of dopants, Glasses, ceramics and glassceramics the composition of which is selected from the compositions of formula $(SrO)_x(Al_2O_3)_{100-x}$ doped with cerium or europium or their mixtures have particularly advantageous luminescence properties.

Transparent glasses, transparent or translucid ceramics and glassceramics have been obtained from a mixture comprising 64.4% of a composition of formula (1) in which $M_1$=Ba, x=50, y=0 and z=0 and 30.3% of $SiO_2$ and 5.3% of $Na_2O$.

In the embodiment comprising a mixture of additive elements in addition to the composition of formula (I), the addition of at least 15% of $SiO_2$ significantly lowers the melting temperature of elements making up the material and favourably introduces oxides volatile at high temperature, such as boron, phosphorous, sodium and potassium oxides. The mixture of formative and modifying oxides of alkaline type brings the melting temperature of the elements constituting the glass to the classic thermal field of glass ovens (1500-1600° C). Also, this addition of vitrifying elements prevents accidental crystallisation of the glass as it cools. Crystallisation must occur perfectly controlled during annealing processing of the glass.

As a general rule, for percentages in $SiO_2$ greater than 15%, better results in terms of transparency/ translucidity are obtained when the proportions of different elements constituting glass, ceramic or glassceramic are stœchiometric.

Therefore, the glass, ceramic or glassceramic of the present invention can comprise at least 60% by mass of a composition of formula (I) and up to 40% of additive elements such as described hereinabove in which the proportions of the different elements are stoechiotnetric.

In an embodiment, the material of the present invention comprises at least 75% by mass of a composition of formula (I) and the complement en conventional additive elements. The additive elements are in the following proportions:
up to 25% of $SiO_2$, preferably at least 5% of $SiO_2$;
up to 15% of $B_2O_3$ (from 0 to 15% of $B_2O_3$);
up to 10% of $P_2O_5$ (from 0 to 10% of $P_2O_5$);
up to 5% of $Na_2O$ (from 0 to 5% of $Na_2O$);
up to 5% of $K_2O$ (from 0 to 5% of $K_2O$).

In a preferred embodiment, the material of the present invention comprises at least 85%, such as from 85% to 100%, preferably from 95% to 100%, by mass, relative to the total mass of the material, of a composition of the following formula I:

$$(M_1O)_x(M_2O)_y((M_3)_2O_3)_z(Al_2O_3)_{100-x-y-z} \quad (I)$$

where
$M_1$ represents e selected from Ba and/or Sr, and
$M_2$ represents an element selected from Mg or Ca, and
x and y represent numbers such that $30 \leq x+y \leq 80$, and
y is between 0 and 10% of x, and
M represents an element selected from B, Ga or In, and
z represents a number between 0 and 10% of (100−x−y).
with the exclusion of materials comprising 100% by mass of a composition of formula:

$$(MO)_x(Al_2O_3)_{100-x}$$

with M representing an clement Ba or Sr and x representing a. number between 55 and 75, when said material is a transparent glass.

The material of this preferred embodiment comprises in addition to the composition of the formula (I) conventional additive elements, that is, up to 15%, or up to 5%, by mass of conventional additive elements.

Therefore, in an embodiment, the material can comprise in addition to the composition of formula (I) $SiO_2$ or $B_2O_3$. Therefore, in this embodiment, the material can comprise up to 15%, or up to 5%, by mass of $SiO_2$ or $B_2O_3$. Adding $SiO_2$ can prove intriguing in economic terms. The addition of $SiO_2$ or $B_2O_3$ offers the possibility of working the glasses at temperatures lower than a few hundreds of degrees (for compositions richest in formative oxides) relative to the other compositions. Therefore, the glasses can be worked at temperatures of around 1700° C. instead of 2000° C., employing classic melting processes. In particular embodiments, the material comprises 90%, or 92% or 98% of a composition of formula (I) and respectively 10%, or 8% or 2% of SiO2 or $B_2O_3$.

In another embodiment, the material can comprise in addition to the composition of formula I a mixture of $SiO_2$ and $B_2O_3$. Therefore the material can be between 0 and 15% by mass, advantageously between 2 and 15% by mass, even more advantageously between 2 and 10% of a mixture of $SiO_2$ and $B_2O_3$. Advantageously, the material can be between 0 and 10% by mass, preferably between 2 and 8% by mass of $SiO_2$ and between 0 and 5% by mass, preferably between 1 and 9% by mass of $B_2O_3$. The addition of these oxides allows for obtaining the glasses at lower temperatures.

In another embodiment, the material can comprise in addition to the composition of formula (1) $SiO_2$ and/or $B_2O_3$ and one or more dopants. The dopants are such as described hereinabove. Therefore, in this mode realisation, the material can comprise up to 15%, or up to 5%, by mass d'un mixture comprising of the $SiO_2$ and/or of the $B2O_3$ and one or more dopants, the dopants representing less than 5% by mass of the total composition of the material.

In particular embodiments of the the material selected from ceramic or glassceramic comprises 100% by mass of a composition of formula (I).

In the different embodiments described hereinabove, the composition of formula can be such that:
x and y represent advantageously numbers such that $30<x+y<50$, even more advantageously such that $30<x+y<45$; and/or
y is a number between 5 and 10% of x, advantageously equal to 10% of x; or
y is a number between 0 and 5% of x, advantageously equal to 0; and/or
z is advantageously a number between 0 and 5% of (100−x−y); and/or
$M_2$ represents the element Mg; or
$M_2$ represents the element Ca; and/or
$M_3$ advantageously represents the element B; and/or
z is equal to 0.

The composition of formula (I) can also be such as described hereinbelow.

Therefore, according to a preferred embodiment of the invention, the composition of formula. (1) is such that $M_1$ represents Ba and x and y represent numbers such that $30 \leq x+y \leq 50$, even more advantageously such that $31<x+y<38$.

Preferably, the composition (1) is selected from the compositions of formula Ia:

$$(BaO)_x(Al_2O_3)_{100-x} \quad (Ia)$$

with x such that $30 \leq x \leq 80$, advantageously such that $30<x<45$ or $50<x<80$, even more advantageously such that $31<x<38$.

According to another preferred embodiment, the composition of formula (I) is such that $M_1$ represents Sr and x and y being numbers such that $30<x+y<50$, even more advantageously such that $30<x+y<45$, even more advantageously such that $36<x+y<41$.

Preferably, the composition (I) is selected from the compositions of formula Ib;

$$(SrO)_x(Al_2O_3)_{100-x} \quad (Ib)$$

with x representing a number such that $30<x<50$, even more advantageously such that $30<x<45$, even more advantageously such that $36<x<41$.

According to another particular embodiment, the composition of formula (I) is selected from the compositions of formula (Ic):

$$(M_1O)_x(Al_2O_3)_{100-x}$$

with $M_1$ representing an element Ba or Sr and x representing a number between 50 and 75.

A particularly advantageous composition of formula. (I) is the composition of formula $Sr_3Al_7O_6$, corresponding to the formula: $[(SrO)_{75}(Al_2O_3)_{25}]$.

Other advantageous compositions of formula (I) include the compositions of formula $BaAl_2O_4$, $BaAl_4O_7$, $Sr_3Al_2O_6$, $Sr_3Ga_2O_6$ and $SrAl_2O_4$.

Glassceramic and Particular Embodiments

In the embodiments described earlier, the glassceramic can preferably comprise: a composition of formula (I) such that $M_1$ represents Ba and x and y are numbers such that $30 \leq x+y \leq 80$, even more advantageously such that $30<x+y<80$, even more advantageously such that $30<x+y<45$ or $50<x+y<80$, even more advantageously such that $30<x+y<40$ or $60<x+y<80$; or a composition of formula (I) selected from the compositions of formula Ia:

$$(BaO)_x(Al_2O_3)_{100-x} \qquad (Ia)$$

with x representing a number such that 30≤x≤80, advantageously such that 30<x<80, advantageously such that 30<x<45 or 50<x<80, even more advantageously such that 30<x<40 or 60<x<80, even more advantageously such that 31<x<38 or 61<x<76, even more advantageously such that 31<x<38; or a composition of formula (I) such that $M_1$ represents Sr and x and y being numbers such that 30≤x+y≤80, even more advantageously such that 30<x+y<80, even more advantageously such that 30<x+y<45 or 48<x+y<80, or even such that 30<x+y<45 or 52<x+y<80, even more advantageously such that 36<x+y<41 or 54<x+y<76; or a composition of formula (I) selected from the compositions of formula Ib:

$$(SrO)_x(Al_2O_3)_{100-x} \qquad (Ib)$$

with x representing a number such that 30<x<80, even more advantageously such that 30<x<45 or 48<x<80, or even such that 30<x<45 or 52<x<80, even more advantageously such that 36<x<41 or 54<x<76, even more advantageously such that 54<x<76.

These preferred compositions of formula (I) can also be advantageously employed for preparing glassceramics such as described hereinbelow, that is, glassceramics comprising at least 85% of a composition of formula (I).

In one aspect, the present invention relates particularly to a transparent or translucid glassceramic comprising at least 85%, such as from 85% to 100%, preferably from 95 to 100%, by mass, relative to the total mass of the glassceramic, of a composition of the following formula I:

$$(M_1O)_x(M_2O)_y((M_3)_2O_3)_z(Al_2O_3)_{100-x-y-z} \qquad (I)$$

where
$M_1$ represents an element selected from Ba and/or Sr, and
$M_2$ represents an element selected from Mg or Ca, and
x and y represent numbers such that 30≤x+y≤80, and
y is between 0 and 10% of x, and
$M_3$ represents an element selected from B, Ga or In
z represents a number between 0 and 10% of (100−x−y).

Advantageously, x and y are numbers such that 30<x+y<80, even more advantageously such that 30<x+y<45 or 48<x+y<80.

In practice, the inventors have noted that the glassceramics for which x and y are numbers such that 30<x+y<45 or 48<x+y<80 are not only translucid, but also transparent.

The glassceramics comprising a composition (I) selected from the compositions of formula Ib;

$$(SrO)_x(Al_2O_3)_{100-x} \qquad (Ib)$$

with x representing a number such that 30≤x≤80, even more advantageously such that 30<x<45 or 48<x<80, even more advantageously such that 36<x<41 or 48<x<76, even more advantageously such that 48<x<76, present particularly interesting optical properties, especially in terms of luminescence.

Preferred glassceramics can be obtained from the glasses of composition of formula (Ic):

$$(M_1O)_x(Al_2O_3)_{100-x} \qquad (Ic)$$

with $M_1$ representing an element Ba or Sr and x representnig a number between 50 and 75, advantageously by annealing.

In a preferred embodiment of the invention, the composition of the crystallised phase of the glassceramic is selected from the compositions of formula $BaAl_2O_4$, $BaAl_4O_7$, $SrAl_2O_4$ and $Sr_3Al_2O_6$.

The glassceramic of the present invention comprises if necessary in addition to the composition of formula (I), (Ia), (Ib) or (Ic) conventional additive elements such as described hereinabove to reach 100% by mass.

Quite particularly, the glassceramic can comprise up to 15% of $SiO_2$ and/or of $B_2O_3$ and optionally doping elements.

Advantageously, the glassceramiccan comprise between 0 and 5% molar of a dopant relative to x. The dopants are such as described hereinabove, preferably selected from rare earths, preferably lanthanides. Dopants can also be selected from transition elements (for example Cr, Mn, Fe, Co, Ni etc:). Dopants represent less than 5% by mass relative to the total mass of the glassceramic. Glassceramics doped in europium and cerium present particularly advantageous properties of luminescence and in particular phosphorescence. By analogy with the monocrystals of formula $SrAl_2O_4$ which are also known as the best phosphorescent materials in the monocrystalline state to date, the ceramics and glassceramics of formulas $SrAl_2O_4$ and $Sr_3Al_2O_6$ doped in europium are particularly preferred for their phosphorescence properties.

In some embodiments, the glassceramic of the present invention comprises 100% by mass of the composition of formula (I), (Ia), (Ib) or (Ic).

The crystallisation rate of the glassceramic according to the invention is advantageously between 50% and 98%, that is, 50% and 98% by weight of the material is crystalline. Preferably, the crystals constituting the glassceramics according to the invention have a size of between 1 and 5 μm.

The glassceramics according to the invention are transparent or translucid. They present advantageously a normal light transmission value greater than 50%.

Ceramic and Particular Embodiments

The present invention relates quite particularly to transparent or translucid ceramic comprising at least 85%, such as from 85% to 100%, preferably from 95% to 100%, by mass, relative to the total mass of the ceramic, of a composition of formula (I) following:

$$(M_1O)_x(M_2O)_y((M_3)_2O_3)_z(Al_2O_3)_{100-x-y-z} \qquad (I)$$

where
$M_1$ represents an element selected from Ba and/or Sr, and
$M_2$ represents an element selected from Mg or Ca, and
x and y represent numbers such that 30≤x+y≤80, and
y is between 0 and 10% of x, and
$M_3$ represents an element selected from B, Ga or In
z represents a number between 0 and 10% of (100−x−y).

Advantageously, x and y are numbers such that 30<x+y<80, even more advantageously such that 30<x+y<45 or 48<x+y<80, or such that 30<x+y<45 or 52<x+y<80.

The ceramic can preferably comprise compositions of formula (I) such as described in relation to the glassceramics of the present invention.

Preferably, crystals making up the ceramics according to the invention have a size of between 1 and 5 μm.

Preferred ceramics can be obtained from the glasses of composition of formula (Ic) following:

$$(M_1O)_x(Al_2O_3)_{100-x} \qquad (Ic)$$

with $M_1$ representing an element Ba or Sr and x representing a number between 50 and 75, advantageously by annealing.

In a preferred embodiment of the invention, the preferred composition of the ceramic corresponds to one of the following formulas: $BaAl_2O_4$, $BaAl_4O_7$, $SrAl_2O_4$ and $Sr_3Al_2O_6$.

The ceramic of the present invention comprises in addition to the composition of formula (I) or (Ic) conventional additive elements such as described hereinabove. Quite particularly, the ceramic can comprise up to 15% of $SiO_2$ and/or $B_2O_3$ and optionally doping elements.

Advantageously, the ceramic can be between 0 and 5% molar of dopant relative to x. Dopants are such as described hereinabove, preferably selected from rare earths, preferably lanthanides or from transition elements.

The crystallisation rate of the ceramic according to the invention is between 98% and 100%, that is, 98% and 100% by weight of the material is crystalline.

The ceramics according to the invention are transparent. They advantageously present a normal light transmission value greater than 40%.

Manufacturing Processes of Ceramics or Glassceramics

The present invention also relates to a manufacturing process of a transparent or translucid ceramic or glassceramic by a glassmaking process. As indicated earlier, the glassmaking process used in the present invention includes an annealing step of a glass (thermal processing of the glass for controlled crystallising). The glass is prepared by melting raw materials in its composition resulting in a liquid, followed by solidification of this liquid. Therefore, the glassmaking process used in the present invention comprises a manufacturing step of transparent glass, followed by an annealing step of the glass. The manufacturing step of the glass comprises a melting step of the raw materials, followed by their solidification.

The present invention relates to a manufacturing process of transparent or translucid ceramic or glassceramic according to the invention comprising the steps of:

1—manufacturing transparent glass comprising at least 60%, such as from 60 to 100%, preferably at least 75%, by mass, relative to the total mass of the glass, of a composition of the following formula I:

$(M_1O)_x(M_2O)_y((M_3)_2O_3)_z(Al_2O_3)_{100-x-y-z}$ where
$M_1$ represents an element selected from Ba and/or Sr, and
$M_2$ represents an element selected from Mg or Ca, and
x and y represent numbers such that $30 \leq x+y \leq 80$ and
y is between 0 and 10% of x, and
$M_3$ represents an element selected from B, Ga or In
z represents a number between 0 and 10% of (100−x−y),
the complement being such as described hereinabove;

2—annealing of this glass at a temperature between 900° C. and 1200° C. over a time between 15 min and 24 h, preferably between 15 min and 5 h 30, preferably between 30 min and 4 h or between 1 h and 2 h.

The glass is obtained by melting starting oxide powders at a temperature between 1500° C. and 2200° C. When the glass comprises at least 15% of $SiO_2$, such as from 15% to 40% or from 20% to 40%, the glass can be obtained by melting starting oxide powders at temperatures typically used in conventional glassmaking processes, or at a temperature between 1500° C. and 1700° C. The melting temperature will be adapted as a function of the percentage by mass of formative oxides and modifying oxides. When melting is conducted between 1500° C. and 1700° C., it can be done in ovens made of refractory bricks heated with gas.

Preferably, the process includes no nucleation processing.

In a particular embodiment, the manufacturing process of transparent ceramic or glassceramic according to the invention comprises the steps of:

1—manufacturing transparent glass comprising at least 85% by mass, relative to the total mass of the glass, of a composition of the following formula I:

$(M_1O)_x(M_2O)_y((M_3)_2O_3)_z(Al_2O_3)_{100-x-y-z}$ where
$M_1$ represents an element selected from Ba and/or Sr, and
$M_2$ represents an element selected from Mg or Ca, and
x and y represent numbers such that $30 \leq x+y \leq 80$ and
y is between 0 and 10% of x, and
$M_3$ represents an element selected from B, Ga or In
z represents a number between 0 and 10% of (100−x−y), 2—annealing of this glass at a temperature between 900° C. and 1200° C. over a time between 15 min and 24 h, preferably between 15 min and 4 h, preferably between 30 min and 2 h.

It should be noted, preferably, that this process includes no nucleation processing.

The glass is obtained by melting starting oxide powders at a temperature between 1600° C. and 2200° C.

Those skilled in the art can adapt the melting temperature necessary for producing the glass as a function of the percentage by mass of formative oxides introduced to form the glass. For example, for contents of formative oxides of glass typically between 10% by mass and 15% by mass relative to the total mass of the elements making up the glass, the heating temperature will be selected in a low range preferably between 1600° C. and 1900° C., even more preferably between 1600° C. and 1800° C. However, for contents of formative oxides of glasses, typically between 0% by mass and 5% by mass relative to the total mass of the elements making up the glass, the heating temperature will be selected in a high range preferably between 1900° C. and 2200° C., even more preferably between 2000° C. and 2100° C.

Heating takes place preferably in an oven at very high temperature of cold-wall auto-crucible type (mixing of unmated oxides in contact with the water-cooled wall) to avoid problems of corrosion and pollution of the mixture at very high temperature. The prescribed heating system is electric arc, optionally direct induction in the mixture of melted oxides (hightemperature electric conductors). Another process is also feasible for producing relatively low quantities of material (a few kg per day): an iridium crucible heated by induction.

Adding 15% of formative glass oxides can lower the operating temperature by around 300° C. (around 1700° C.), giving access to more conventional glassmaking working procedures (gasheated refractory oven, for example). However, phases (silicates in the ease of the silica, borates in the case of boron oxide) can appear in glasseeramies and ceramics beyond 15% of $SiO_2$, risking lowering optical performances of barium and/or strontium aluminates according to the invention. To prevent any such problem, the proportions of the different elements making up the glass, ceramic or glassceramic can be selected so as to be stachiometric.

The melting mixture is then cast in a mould and cooled.

The glasses are kept at the crystalline growth temperature for a longer duration to produce ceramics than for producing glassceramics. Therefore, the vitreous material has time to crystallise at more than 98%, that is, more than 98% by weight of the material is crystalline. During manufacturing of glassceratnics, the vitreous material is not given time to reach a crystallisation rate of 98%.

Therefore, the process according to the invention preferably does not involve a nucleation step. The use of nucleation catalysts is therefore no longer needed. The process according to the invention is therefore simpler and less expensive than the process described in U.S. Pat. No. 3,635,739.

Those skilled in the art can adapt the annealing time to produce transparent translucid ceramics or glassceratnics.

To produce glassceramic, the time for crystalline growth is preferably between 15 min and 2 h, preferably between 15 min and 1 h.

To produce ceramic, the time for crystalline growth is preferably between 15 min and 24 h, more preferably between 15 min and 4 h, even more preferably between 30 min and 2 h.

The oven used for the annealing step is preferably a classic convection oven and/or one equipped with heating resistors.

Therefore, the ceramics and glassceraimics according to the invention are likely to be obtained by annealing of glass according to the invention, at a temperature between 900° C. and 1200° C. over a time between 15 min and 24 h, preferably between 15 min and 5 h 30 or between 30 min and 4 h, or between 1 h and 2 h. Preferably, the process does not involve a nucleation step.

Transparent ceramics and transparent glassceramics prepared by a glassniaking process can be formed very easily. In fact, the glassmaking process employed for their manufacturing makes, by way of casting in a mould, pieces having highly varied forms and of large dimensions. It is impossible to produce such variety of forms via the operating techniques for monocrystals or ultra-dense nanometric polycrystalline ceramics for optics (obtained by sintering under high pressure and high temperature). In fact, the sintering process used requires pressing a step (under high pressure), incompatible with producing varied forms (classic forms obtained under pressure being of cylindrical or parallelepipedic type).

Use of Ceramics, Glassceramics and Glasses

The present invention finally relates to the use of ceramic or glassceramic or glass according to the invention for manufacturing equipment for optics.

In particular, scintillater materials apply to the field of the medical imaging or the field of high-energy physics. There are also applications requiring lower performance in the field of detection (for example in geology). Luminescent (fluorescent or phosphorescent) materials apply in the field of lighting and display; for example they can be used in LED (electroluminescent diodes).

The ceramics and glassceramics according to the invention are useful in general for conversion of particles and ionising radiation (electrons, gamma, X . . . ) in UV-visible emission. In the case of scintillaters, these transparent ceramics can be used for example in medical imaging (doping with cerium for so-called "rapid" scintillations for simultaneous detection of events) or for high-energy physics (particles and ionising radiation).

It should be noted that the more the material is crystallised, the finer the rays of light emitted (specific wavelengths). This means that ceramics have greater optical efficiency for some applications requiring fine rays, especially for scintillater materials.

However, some applications do not need good resolution of rays, but rather a sufficiently strong light intensity. This is the case especially for display or lighting. Glassceramics are then well adapted.

According to an embodiment, the ceramics and glassceramics according to the invention are used for manufacturing medical imaging equipment. In fact, the presence of barium in the composition is an element favourable for absorption of radiation such as X-rays. The ceramics according to the invention are preferably used for manufacturing medical equipment.

According to another embodiment of he invention, they are used for manufacturing equipment for lighting or for display.

A particular case is the use of glass of the invention for laser inscription. Laser scanning (well controlled by a pilot program) can cause localised crystallisation in situ (under the impact of the radiation and local heating produced by the laser). This technique tends to mark the glass by contrast between the glass and the glassceramie points.

EXAMPLES

The following examples are intended to illustrate the present invention in more detail, but are nonlimiting.

Preparation of Glasses of Formula $(BaO)_x(Al_2O_3)_{100-x}$ and $(SrO)_x(Al_2O_3)_{100-x}$ Glasses of barium and strontium aluminates have been prepared by melting mixtures of oxides in an aerodynamic levitator: $(BaO)_x(Al_2O_3)_{100-x}$ and $(SrO)_x(Al_2O_3)_{100-x}$ respectively. Particular study was made of fields such that $32<x<37$ and $62<x<76$ when $M_1$ represents Ba, $37<x<40$ and $55<x<76$ when $M_1$ represents Sr.

Glasses of alkaline-earth aluminates have been manufactured in an aerodynamic levitator (1) (see FIG. 4) equipped with two lasers $CO_2$ (2). The aerodynamic levitator (1) is equipped with three optical pyrometers ($\lambda=0.85$ μm (3) and $\lambda=5$ μm (4)), (3 and 4), a cooling system (5), an ascending gas flux (6), an oxygen analyser (7) and a CCD camera (8).

Figure 1:
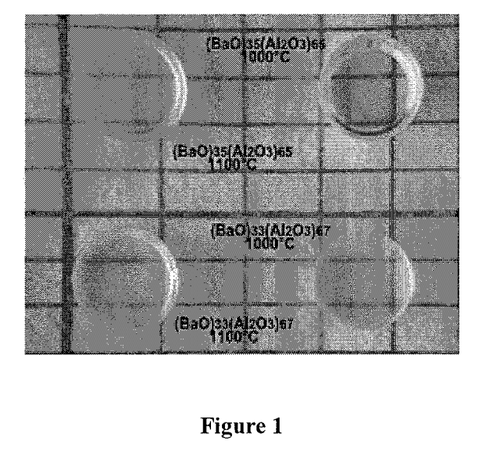
FIG. 1: $BaAl_4O_7$ ceramics made from glasses of formula $(BaO)_{33.3}(Al_2O_3)_{66.7}$ and $(BaO)_{35}(Al_2O_3)_{65}$ with different annealing temperatures.
Figure 2:
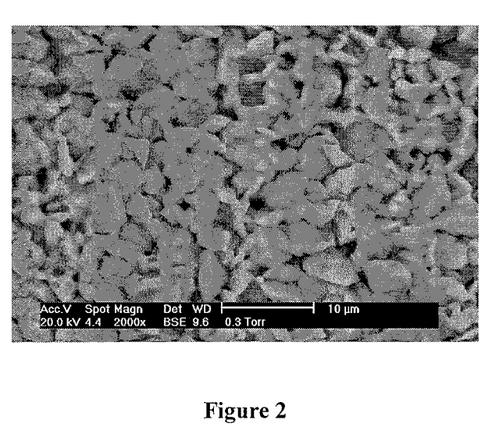
FIG. 2: electronic scanning microscopy microstructure of $BaAl_4O_7$ transparent ceramics (enlargement: x 2000)
Figure 3:
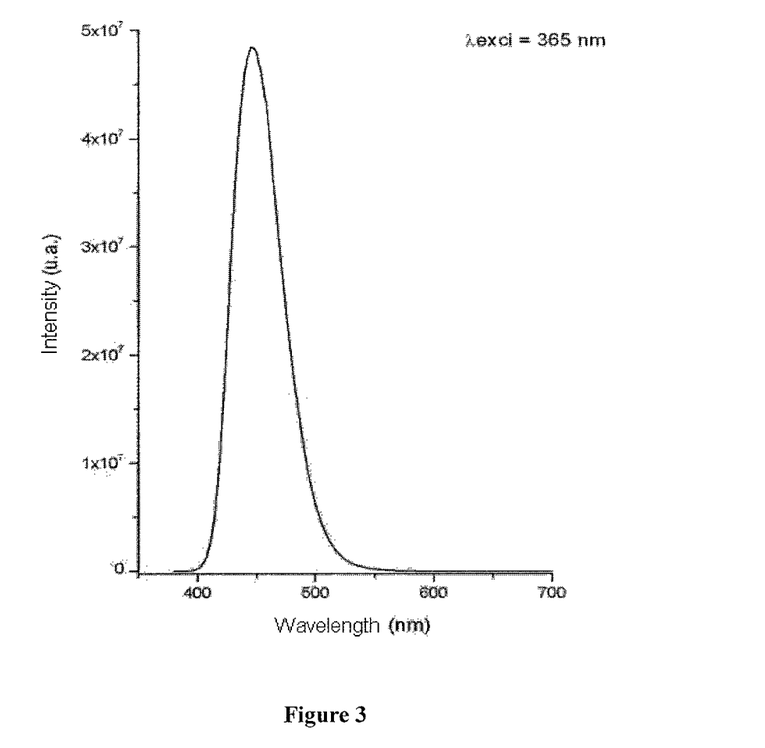
FIG. 3: emission band of $BaAl_4O_7$ ceramics doped with europium. The abscissae axis represents the wavelength (in nm) and the ordinates axis represents the intensity (in $10^7$ arbitrary units (u.a.)). The excitation wavelength ($\lambda_{exci}$) is i therefore 365nm.
Figure 4:
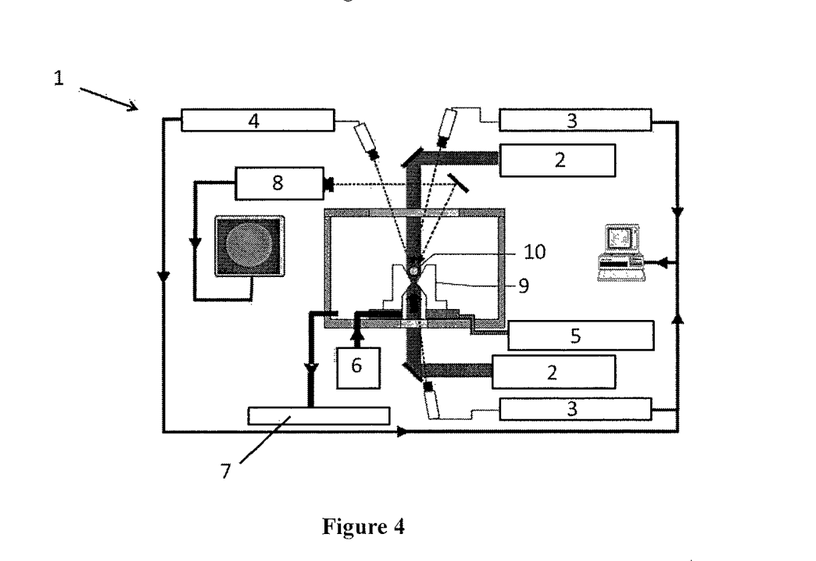
FIG. 4: Diagram of an aerodynamic levitator equipped with two $CO_2$ lasers

The process involves the steps following:

Mixing of powders of alkalineearth oxides, aluminate and other oxides.

Compression of the mixture by means of a pelletiser. A small piece (of the order of a few hundreds of mg) of the pellet obtained is placed in the conical nozzle (9) of the levitator.

Irradiation of the sample (10) via the top and via the bottom by two lasers $CO_2$ (2) to melt the mixture of oxides. An ascending gas flow (argon, in this case) (6) levitates the resulting liquid mixture.

Instantaneous cutting by both lasers. The evolution of the temperature of the material during soaking is followed by optical pyrometry. Glass of spherical form is obtained.

Figure 5:
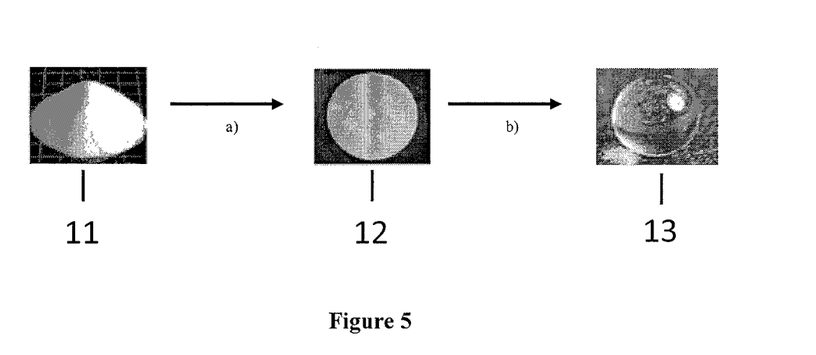
FIG. 5: Diagram describing the manufacturing steps of a glass by aerodynamic levitation: a mixture of oxide undergoes melting by $CO_2$ laser to result in a mixture of melted oxide, then in glass after rapid soaking.

These different steps are illustrated by FIG. 5. The oxide powders are mixed. The oxide mixture (11) is melted by means of lasers $CO_2$ (a). The melted oxide mixture undergoes rapid soaking (b) to result in glass (13). The glass obtained after the soaking step is perfectly transparent.

Working of Transparent Ceramics:

Transparent ceramics of barium aluminates according to the invention were obtained after annealing.

Ceramics of $BaAl_4O_7$ made from glasses of formula $(BaO)_{33.3}(Al_2O_3)_{66.7}$ and $(BaO)_{35}(Al_2O_3)_{65}$ are in two different forms, known as phase (I) and phase (II), as a function of time and annealing temperature.

For example, for the vitreous composition $(BaO)_{33.3}(Al_2O_3)_{66.7}$, annealing at 1000° C., for 1 h, produces a glassceramic of $BaAl_4O_7$ (I). For a longer annealing time this phase transforms progressively into $BaAl_4O_7$ (II). For annealing of 2 h 00, the two phases coexist. For 24 h of annealing the phase $BaAl_4O_7$ (I) is completely transformed into $BaAl_4O_7$ (II).

Experiments have shown that annealing at temperatures higher than 1300° C. causes decomposition of the phase of $BaAl_4O_7$ into $BaAl_2O_4$ and $BaAl_{12}O_{49}$ and the loss of transparency.

Measuring the Specular Transmission:

The specular transmission (T) is defined as being equal to $I/I_0$ with $I_0$ the intensity of the incident wave and I the intensity of the transmitted wave. The intensity I is always less than $I_0$, as part of the incident wave is not transmitted due to reflection, absorption and diffusion by the sample. The samples studied must be polished to have two parallel faces, devoid of grooves.

The transmission of ceramics of barium aluminates according to the invention has been measured for a wavelength of 633 nm, generated by a HeNe laser. Also, transmission of these materials has been measured as a function of the wavelength, in the 250-800 nm spectral field, using a double-beam Varian Cary 5000 spectrophotometer.

The transparency of these ceramics has been quantified by measuring their transmission at 633 nm. Table 1 presents the incident intensities ($I_0$), the transmitted intensities (I) and their transmission (T).

TABLE 1

Average transmission values of ceramics of
$BaAl_4O_7$ (I) and (II) made from glasses of $(BaO)_{33.3}(Al_2O_3)_{66.7}$
and $(BaO)_{35}(Al_2O_3)_{65}$ (thickness = 2 mm).

|  | I | $I_0$ | $I/I_0$ | Average of $I/I_0$ |  |
|---|---|---|---|---|---|
| Ceramic of $BaAl_4O_7$ (II) | 4.89 | 12.82 | 38% | | |
| made from glass | 5.1 | 12.82 | 40% | | |
| $(BaO)_{35}(Al_2O_3)_{65}$ | 5.05 | 12.91 | 39% | average | 39% |
| Ceramic of $BaAl_4O_7$ (I) | 9.1 | 13 | 70% | | |
| made from glass | 9.18 | 13.05 | 70% | | |
| $(BaO)_{35}(Al_2O_3)_{65}$ | 9.1 | 13 | 70% | average | 70% |
| Ceramic of $BaAl_4O_7$ (II) | 5.13 | 13.02 | 39% | | |
| made from glass | 5.13 | 12.97 | 40% | | |
| $(BaO)_{33.3}(Al_2O_3)_{66.7}$ | 5.15 | 12.98 | 40% | average | 40% |
| Ceramic of $BaAl_4O_7$ (I) | 7.86 | 13.97 | 56% | | |
| made from glass | 7.82 | 12.99 | 60% | | |
| $(BaO)_{33.3}(Al_2O_3)_{66.7}$ | 7.95 | 13 | 61% | average | 59% |

Examples of Transparent Ceramics

The ceramics exemplified in Table 2 have been prepared such as described hereinabove. The melting and annealing temperatures and the duration of annealing are such as indicated in Table 2. The resulting ceramics are transparent (TP) translucid (TL).

TABLE 2

Transparent or translucid ceramics

| Composition of formula I (% by mass) | Vitrifying elements (% by mass) | Melting T (° C.) | Annealing T (° C.) t (h) | Resulting ceramic | Crystallised phases |
|---|---|---|---|---|---|
| $BaAl_2O_4$ (85.1) | $SiO_2$ (14.9) | 1700 | 1100 1 h 30 | TP | $BaAl_2O_4$ + $BaAl_2Si_2O_8$ |
| $BaAl_2O_4$ (81) | $SiO_2$ (19) | 1700 | 1100 2 h | TP | $BaAl_2Si_2O_8$+ other phase |
| $BaAl_2O_4$ (76.1) | $SiO_2$ (23.9) | 1750 | 1100 5 h | TP | $BaAl_2Si_2O_8$+ other phase |
| $BaAl_2O_4$ (68) | $SiO_2$ (32) | ≈1800 | 1100 1 h 30 | TP | $BaAl_2Si_2O_8$ |
| $BaAl_2O_4$ (64.4) | $SiO_2$ (30.3) $Na_2O$ (5.3) | 1550 | 1100 1 h 30 | TL | $BaAl_2Si_2O_8$ |
| $Sr_3Al_2O_6$ | — | ≈2000 | 840 5 h | TP | $Sr_3Al_2O_6$ |
| $Sr_3Ga_2O_6$ | — | ≈2000 | 750 2 h | TP | $Sr_3Ga_2O_6$ |
| $SrAl_2O_4$ (87.3) | $SiO_2$ (12.7) | 1750 | 1000 4 h 30 1000 25 h | TP opaque | Sr aluminosilicate Sr aluminosilicate |
| $SrAl_2O_4$ (72) | $SiO_2$ (28) | 1700 | 1100 3 h 30 | TP | $SrAl_2Si_2O_8$ |
| $SrAl_2O_4$ (63.1) | $SiO_2$ (36.9) | 1700 | 1100 4 h | TP | $SrAl_2Si_2O_8$ |

The invention claimed is:

1. A transparent or translucid ceramic with no porosity obtained by a preparation process for ceramics including an annealing step of a glass, said ceramic comprising at least 60% by mass, relative to the total mass of the ceramic, of a composition of the following formula I:

$$(M_1O)_x(M_2O)_y((M_3)_2O_3)_z(Al_2O_3)_{100-x-y-z} \quad (I)$$

wherein
$M_1$ represents an element selected from Ba and/or Sr,
$M_2$ represents an element selected from Mg or Ca,
x and y represent numbers such that 30≤x+y≤80,
y is between 0 and 10% of x,
$M_3$ represents an element selected from B, Ga or In, and
z represents a number between 0 and 10% of (100−x−y),
said ceramic presenting a polycrystalline structure in which the crystals have a size of between 1 μm and 100 μm,
said ceramic further comprises additive elements selected from network former oxides selected from $SiO_2$, boron oxide ($B_2O_3$) and phosphorous oxide ($P_2O_5$), alkaline network modifier oxides selected from sodium oxide ($Na_2O$) and potassium oxide ($K_2O$), dopants selected from rare earths and combinations thereof.

2. A transparent or translucid glassceramic obtained by a preparation process for glassceramic including an annealing step of a glass, said glassceramic comprising at least 60% by mass, relative to the total mass of the glassceramic, of a composition of the following formula I:

$$(M_1O)_x(M_2O)_y((M_3)_2O_3)_z(Al_2O_3)_{100-x-y-z} \quad (I)$$

wherein
$M_1$ represents an element selected from Ba and/or Sr,
$M_2$ represents an element selected from Mg or Ca,
x and y represent numbers such that 30≤x+y≤80,
y is between 0 and 10% of x,
$M_3$ represents an element selected from B, Ga or In, and
z represents a number between 0 and 10% of (100−x−y).

3. The ceramic according to claim 1 comprising at least 85% by mass, relative to the total mass of the ceramic of the composition of formula I.

4. The ceramic according to claim 1, wherein x and y represent numbers such that 30<x+y<45.

5. The ceramic according to claim 1, wherein the composition is such that $M_1$ represents Ba and x and y represent numbers such that 30<x+y<45 or 50<x+y<80.

6. The ceramic according to claim 1, wherein the composition is selected from the compositions of formula Ia $(BaO)_x(Al_2O_3)_{100-x}$, with x representing a number such that 30<x<45 or 50<x<80.

7. The ceramic according to claim 6, wherein the composition is selected from the compositions of formula Ia $(BaO)_x(Al_2O_3)_{100-x}$, with x representing a number such that 31<x<38 or 61<x<76.

8. The ceramic according to claim 1, wherein the composition is such that $M_1$ represents Sr and x and y represent numbers such that 30<x+y<45 or 52<x+y<80.

9. The ceramic according to claim 1, wherein the composition is selected from the compositions of formula Ib $(SrO)_x(Al_2O_3)_{100-x}$, with x representing a number such that 30<x<45 or 52<x+y<80.

10. The ceramic according to claim 9, wherein the composition is selected from the compositions of formula Ib $(SrO)_x(Al_2O_3)_{100-x}$, with x representing a number such that 36<x<41 or 54<x<76.

11. The ceramic according to claim 3, comprising between 0% and 15% by mass of $SiO_2$.

12. A process for manufacturing a ceramic according to claim 1 comprising the steps of:
   (1) manufacturing a transparent glass comprising at least 60% by mass relative to the total composition of the glass, of a composition of the following formula I:

$(M_1O)_x(M_2O)_y((M_3)_2O_3)_z(Al_2O_3)_{100-x-y-z}$ wherein
   $M_1$ represents an element selected from Ba and/or Sr,
   $M_2$ represents an element selected from Mg or Ca,
   x and y represent numbers such that $30 \leq x+y \leq 80$,
   y is between 0 and 10% of x,
   $M_3$ represents an element selected from B, Ga or In, and
   z represents a number between 0 and 10% of (100−x−y); and
   (2) annealing of this glass at a temperature between 900° C. and 1200° C. over a time period between 15 minutes and 24 hours.

13. The glassceramic according to claim 2, comprising at least 85% by mass, relative to the total mass of the glassceramic composition of formula I.

14. The glassceramic according to claim 2, wherein x and y represent numbers such that $30<x+y<45$.

15. The ceramic according to claim 3, wherein x and y represent numbers such that $30<x+y<45$.

16. The glassceramic according to claim 13, wherein x and y represent numbers such that $30<x+y<45$.

17. The glassceramic according to claim 2, wherein the composition is such that $M_1$ represents Ba and x and y represent numbers such that $30<x+y<45$ or $50<x+y<80$.

18. The ceramic according to claim 3, wherein the composition is such that $M_1$ represents Ba and x and y represent numbers such that $30<x+y<45$ or $50<x+y<80$.

19. The glassceramic according to claim 13, wherein the composition is such that $M_1$ represents Ba and x and y represent numbers such that $30<x+y<45$ or $50\ 21\ x+y<80$.

20. The glassceramic according to claim 2, wherein the composition is selected from the compositions of formula Ia $(BaO)_x(Al_2O_3)_{100-x}$, with x representing a number such that $30<x<45$ or $50<x<80$.

21. The ceramic according to claim 4, wherein the composition is selected from the compositions of formula Ia $(BaO)_x(Al_2O_3)_{100-x}$, with x representing a number such that $30<x<45$ or $50<x<80$.

22. The glassceramic according to claim 13, wherein the composition is selected from the compositions of formula Ia $(BaO)_x(Al_2O_3)_{100-x}$, with x representing a number such that $30<x<45$ or $50<x<80$.

23. The glassceramic according to claim 2, wherein the composition is selected from the compositions of formula Ia $(BaO)_x(Al_2O_3)_{100-x}$, with x representing a number such that $31<x<38$ or $61<x<76$.

24. The ceramic according to claim 3, wherein the composition is selected from the compositions of formula Ia $(BaO)_x(Al_2O_3)_{100-x}$, with x representing a number such that $31<x<38$ or $61<x<76$.

25. The glassceramic according to claim 13, wherein the composition is selected from the compositions of formula Ia $(BaO)_x(Al_2O_3)_{100-x}$, with x representing a number such that $31<x<38$ or $61<x<76$.

26. The glassceramic according to claim 2, wherein the composition is such that $M_1$ represents Sr and x and y represent numbers such that $30<x+y<45$ or 52 $<x+y<80$.

27. The ceramic according to claim 3, wherein the composition is such that $M_1$ represents Sr and x and y represent numbers such that $30<x+y<45$ or $52<x+y<80$.

28. The glassceramic according to claim 13, wherein the composition is such that $M_1$ represents Sr and x and y represent numbers such that $30<x+y<45$ or $52<x+y<80$.

29. The glassceramic according to claim 2, wherein the composition is selected from the compositions of formula Ib $(SrO)_x(Al_2O_3)_{100-x}$, with x representing a number such that $30<x<45$ or $52<x+y<80$.

30. The ceramic according to claim 3, wherein the composition is selected from the compositions of formula Ib $(SrO)_x(Al_2O_3)_{100-x}$, with x representing a number such that $30<x<45$ or $52<x+y<80$.

31. The glassceramic according to claim 13, wherein the composition is selected from the compositions of formula Ib $(SrO)_x(Al_2O_3)_{100-x}$, with x representing a number such that $30<x<45$ or $52<x+y<80$.

32. The glassceramic according to claim 2, wherein the composition is selected from the compositions of formula Ib $(SrO)_x(Al_2O_3)_{100-x}$, with x representing a number such that $36<x<41$ or $54<x<76$.

33. The ceramic according to claim 3, wherein the composition is selected from the compositions of formula Ib $(SrO)_x(Al_2O_3)_{100-x}$, with x representing a number such that $36<x<41$ or $54<x<76$.

34. The glassceramic according to claim 13, wherein the composition is selected from the compositions of formula Ib $(SrO)_x(Al_2O_3)_{100-x}$, with x representing a number such that $36<x<41$ or $54<x<76$.

35. The glassceramic according to claim 2, further comprising additive elements selected from network former oxides selected from $SiO_2$, boron oxide ($B_2O_3$) and phosphorous oxide ($P_2O_5$), alkaline network modifier oxides selected from sodium oxide ($Na_2O$) and potassium oxide ($K_2O$), dopants selected from rare earths and combinations thereof.

36. The ceramic according to claim 3, further comprising additive elements selected from network former oxides selected from $SiO_2$, boron oxide ($B_2O_3$) and phosphorous oxide ($P_2O_5$), alkaline network modifier oxides selected from sodium oxide ($Na_2O$) and potassium oxide ($K_2O$), dopants selected from rare earths and combinations thereof.

37. The glassceramic according to claim 13, further comprising additive elements selected from:
   network former oxides selected from $SiO_2$, boron oxide ($B_2O_3$) and phosphorous oxide ($P_2O_5$);
   alkaline network modifier oxides selected from sodium oxide ($Na_2O$) and potassium oxide ($K_2O$),
   dopants selected from rare earths;
   and combinations thereof.

38. The glassceramic according to claim 13, comprising between 0 and 15% by mass of $SiO_2$.

39. The ceramic according to claim 1, wherein the crystals do not have a cubic structure.

40. The ceramic according to claim 1, wherein the composition is of formula $BaAl_4O_7$.

41. A transparent or translucid ceramic with no porosity obtained by a preparation process for ceramics including an annealing step of a glass,
   said ceramic comprising at least 95% by mass, relative to the total mass of the ceramic, of a composition of formula $BaAl_4O_7$,
   said ceramic presenting a polycrystalline structure in which the crystals have a size of between 1 μm and 100 μm,
   said ceramic further comprises dopants selected from rare earths and combinations thereof.

42. The glassceramic according to claim 2, wherein the composition is of formula $BaAl_4O_7$.

43. A transparent or translucid glassceramic obtained by a preparation process for glassceramics including an annealing step of a glass, said glassceramic comprising at least 95% by mass, relative to the total mass of the glassceramic, of a composition of formula $BaAl_4O_7$.

\* \* \* \* \*